(12) United States Patent
Barrett

(10) Patent No.: US 8,196,044 B2
(45) Date of Patent: Jun. 5, 2012

(54) CONFIGURATION OF USER INTERFACES

(75) Inventor: Peter T. Barrett, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 1174 days.

(21) Appl. No.: 10/751,694

(22) Filed: Jan. 5, 2004

(65) Prior Publication Data

US 2005/0149501 A1   Jul. 7, 2005

(51) Int. Cl.
G06F 3/00 (2006.01)

(52) U.S. Cl. ........ 715/718; 715/716; 715/717; 715/740; 715/744; 715/745; 715/746; 715/747; 715/765; 725/39; 725/44

(58) Field of Classification Search .......... 715/716–719, 715/740, 744–747, 762–765, 788–789; 725/39, 725/44
See application file for complete search history.

(56) References Cited

U.S. PATENT DOCUMENTS

| | | | |
|---|---|---|---|
| 3,956,745 A | 5/1976 | Ellis | |
| 4,535,333 A | 8/1985 | Twardowski | |
| 4,626,848 A | 12/1986 | Ehlers | |
| 5,579,055 A * | 11/1996 | Hamilton et al. | 725/49 |
| 5,734,853 A * | 3/1998 | Hendricks et al. | 715/716 |
| 5,784,123 A * | 7/1998 | Yoshimi | 348/556 |
| 5,914,713 A * | 6/1999 | Nario et al. | 715/744 |
| 5,969,696 A * | 10/1999 | Stoye | 345/87 |
| 5,977,964 A * | 11/1999 | Williams et al. | 715/721 |
| 5,990,927 A * | 11/1999 | Hendricks et al. | 725/132 |
| 6,002,394 A * | 12/1999 | Schein et al. | 725/39 |
| 6,005,561 A * | 12/1999 | Hawkins et al. | 715/234 |
| 6,020,881 A * | 2/2000 | Naughton et al. | 715/740 |
| 6,020,912 A * | 2/2000 | De Lang | 725/91 |
| 6,025,837 A * | 2/2000 | Matthews et al. | 715/721 |
| 6,028,600 A * | 2/2000 | Rosin et al. | 715/718 |
| 6,127,941 A * | 10/2000 | Van Ryzin | 340/825.69 |
| 6,130,726 A * | 10/2000 | Darbee et al. | 348/734 |
| 6,154,209 A * | 11/2000 | Naughton et al. | 715/764 |
| 6,166,778 A * | 12/2000 | Yamamoto et al. | 348/569 |
| 6,201,536 B1 * | 3/2001 | Hendricks et al. | 715/716 |
| 6,215,467 B1 * | 4/2001 | Suga et al. | 345/660 |
| 6,216,237 B1 * | 4/2001 | Klemm et al. | 714/38 |
| 6,229,524 B1 * | 5/2001 | Chernock et al. | 345/157 |
| 6,292,187 B1 * | 9/2001 | Gibbs et al. | 715/804 |

(Continued)

FOREIGN PATENT DOCUMENTS

EP     0987868     3/2000

(Continued)

OTHER PUBLICATIONS

"Foreign Office Action", Japanese Application No. 2005-000783, (Sep. 22, 2011),9 pages.

(Continued)

Primary Examiner — Weilun Lo
Assistant Examiner — Eric Wiener

(57) ABSTRACT

Configuration of user interfaces is described. In an implementation, a method includes receiving a query from a device. The query is for a user interface (UI) from a client. The UI, when executed by the device, is configured to form a request for execution of a control function by the client. A processing of the request determines whether the execution by the client of the control function is permitted. The processing is performed at a head end by using client state data. The hardware and/or software capabilities of the device to execute the UI are detected. The UI is configured based on the hardware and/or software capabilities of the device.

15 Claims, 6 Drawing Sheets

U.S. PATENT DOCUMENTS

| | | | |
|---|---|---|---|
| 6,295,057 B1 * | 9/2001 | Rosin et al. | 715/744 |
| 6,337,717 B1 * | 1/2002 | Nason et al. | 348/567 |
| 6,392,664 B1 * | 5/2002 | White et al. | 715/717 |
| 6,421,067 B1 * | 7/2002 | Kamen et al. | 715/719 |
| 6,426,762 B1 * | 7/2002 | Nason et al. | 715/788 |
| 6,437,836 B1 * | 8/2002 | Huang et al. | 348/734 |
| 6,442,755 B1 * | 8/2002 | Lemmons et al. | 725/47 |
| 6,445,398 B1 * | 9/2002 | Gerba et al. | 715/721 |
| 6,449,767 B1 * | 9/2002 | Krapf et al. | 725/110 |
| 6,476,825 B1 * | 11/2002 | Croy et al. | 715/716 |
| 6,515,680 B1 * | 2/2003 | Hendricks et al. | 715/716 |
| 6,556,221 B1 * | 4/2003 | Shima et al. | 715/764 |
| 6,587,125 B1 * | 7/2003 | Paroz | 715/740 |
| 6,600,496 B1 * | 7/2003 | Wagner et al. | 715/716 |
| 6,614,457 B1 * | 9/2003 | Sanada et al. | 715/840 |
| 6,628,302 B2 * | 9/2003 | White et al. | 715/717 |
| 6,630,943 B1 * | 10/2003 | Nason et al. | 715/746 |
| 6,637,029 B1 * | 10/2003 | Maissel et al. | 725/46 |
| 6,639,613 B1 * | 10/2003 | Nason et al. | 715/778 |
| 6,677,964 B1 * | 1/2004 | Nason et al. | 715/764 |
| 6,681,395 B1 * | 1/2004 | Nishi | 725/45 |
| 6,717,596 B1 * | 4/2004 | Nason et al. | 715/788 |
| 6,721,954 B1 * | 4/2004 | Nickum | 725/46 |
| 6,727,918 B1 * | 4/2004 | Nason | 715/791 |
| 6,750,886 B1 * | 6/2004 | Bergstedt | 715/784 |
| 6,754,905 B2 * | 6/2004 | Gordon et al. | 725/38 |
| 6,760,046 B2 * | 7/2004 | l'Anson et al. | 715/746 |
| 6,778,559 B2 * | 8/2004 | Hyakutake | 370/486 |
| 6,804,825 B1 * | 10/2004 | White et al. | 725/87 |
| 6,816,841 B1 * | 11/2004 | Suginuma | 705/52 |
| 6,820,278 B1 * | 11/2004 | Ellis | 725/80 |
| 6,828,993 B1 * | 12/2004 | Hendricks et al. | 715/819 |
| 6,839,903 B1 * | 1/2005 | Shintani et al. | 725/39 |
| 6,892,359 B1 * | 5/2005 | Nason et al. | 715/788 |
| 6,897,833 B1 * | 5/2005 | Robinson et al. | 345/2.3 |
| 6,904,610 B1 * | 6/2005 | Bayrakeri et al. | 725/54 |
| 6,918,136 B2 * | 7/2005 | Shepherd | 725/141 |
| 6,934,965 B2 * | 8/2005 | Gordon et al. | 725/54 |
| 6,941,520 B1 * | 9/2005 | Lewallen | 715/762 |
| 6,958,759 B2 * | 10/2005 | Safadi et al. | 345/660 |
| 6,973,619 B1 * | 12/2005 | Hirose et al. | 715/234 |
| 6,978,424 B2 * | 12/2005 | Safadi | 715/765 |
| 7,016,963 B1 * | 3/2006 | Judd et al. | 709/228 |
| 7,039,938 B2 * | 5/2006 | Candelore | 725/87 |
| 7,076,734 B2 * | 7/2006 | Wolff et al. | 715/720 |
| 7,089,499 B2 * | 8/2006 | Steichen et al. | 715/744 |
| 7,093,003 B2 * | 8/2006 | Yuh et al. | 709/219 |
| 7,095,456 B2 * | 8/2006 | Nakajima | 348/734 |
| 7,106,383 B2 * | 9/2006 | Kahn | 348/556 |
| 7,111,242 B1 * | 9/2006 | Grooters | 715/744 |
| 7,117,440 B2 * | 10/2006 | Gordon et al. | 715/721 |
| 7,124,424 B2 * | 10/2006 | Gordon et al. | 725/43 |
| 7,130,623 B2 * | 10/2006 | Kirkeby et al. | 455/420 |
| 7,134,133 B1 * | 11/2006 | Wugofski | 725/39 |
| 7,137,135 B2 * | 11/2006 | Schein et al. | 725/40 |
| 7,155,681 B2 * | 12/2006 | Mansour et al. | 715/762 |
| 7,176,943 B2 * | 2/2007 | Meyers et al. | 345/619 |
| 7,234,111 B2 * | 6/2007 | Chu et al. | 715/251 |
| 7,263,666 B2 * | 8/2007 | Corl et al. | 715/778 |
| 7,337,217 B2 * | 2/2008 | Wang | 709/217 |
| 7,444,336 B2 * | 10/2008 | Karaoguz et al. | 1/1 |
| 7,451,401 B2 * | 11/2008 | Tanskanen et al. | 715/744 |
| 2002/0053084 A1 * | 5/2002 | Escobar et al. | 725/47 |
| 2002/0054086 A1 * | 5/2002 | Van Oostenbrugge et al. | 345/744 |
| 2002/0059425 A1 | 5/2002 | Belfiore et al. | |
| 2002/0059586 A1 * | 5/2002 | Carney et al. | 725/35 |
| 2002/0059596 A1 * | 5/2002 | Sano et al. | 725/39 |
| 2002/0069415 A1 * | 6/2002 | Humbard et al. | 725/52 |
| 2002/0078467 A1 * | 6/2002 | Rosin et al. | 725/110 |
| 2002/0109718 A1 * | 8/2002 | Mansour et al. | 345/744 |
| 2002/0111995 A1 * | 8/2002 | Mansour et al. | 709/203 |
| 2002/0163540 A1 * | 11/2002 | Kishimoto | 345/762 |
| 2002/0184626 A1 * | 12/2002 | Darbee et al. | 725/39 |
| 2002/0196268 A1 * | 12/2002 | Wolff et al. | 345/718 |
| 2003/0043191 A1 * | 3/2003 | Tinsley et al. | 345/762 |
| 2003/0066085 A1 * | 4/2003 | Boyer et al. | 725/104 |
| 2003/0093495 A1 | 5/2003 | McNulty et al. | |
| 2003/0103088 A1 * | 6/2003 | Dresti et al. | 345/835 |
| 2003/0137539 A1 * | 7/2003 | Dees | 345/762 |
| 2003/0192047 A1 * | 10/2003 | Gaul et al. | 725/39 |
| 2003/0208762 A1 * | 11/2003 | Hanai et al. | 725/58 |
| 2003/0220100 A1 * | 11/2003 | McElhatten et al. | 455/418 |
| 2003/0231205 A1 * | 12/2003 | Shima et al. | 345/744 |
| 2003/0234804 A1 * | 12/2003 | Parker et al. | 345/719 |
| 2004/0100490 A1 * | 5/2004 | Boston et al. | 345/744 |
| 2004/0177370 A1 * | 9/2004 | Dudkiewicz | 725/46 |
| 2004/0237104 A1 * | 11/2004 | Cooper et al. | 725/38 |
| 2005/0235319 A1 * | 10/2005 | Carpenter et al. | 725/52 |

FOREIGN PATENT DOCUMENTS

| | | |
|---|---|---|
| JP | 2001236286 | 8/2001 |
| JP | 2002238041 | 8/2002 |
| JP | 2003319360 | 11/2003 |
| JP | 2004348380 | 12/2004 |
| KR | 20030058397 | 7/2003 |
| MX | 266817 | 5/2009 |
| WO | WO 89/03085 | 4/1989 |
| WO | WO 01/69380 | 9/2001 |

OTHER PUBLICATIONS

"Foreign Office Action", Japanese Application No. 2005-000783, (Apr. 1, 2011), 8 pages.

"Foreign Office Action", Korean Application No. 10-2005-0000724, (May 26, 2011), 5 pages.

* cited by examiner

CONFIGURATION OF USER INTERFACES

TECHNICAL FIELD

The present invention generally relates to the field of user interfaces and in particular to configuration of user interfaces.

BACKGROUND

Users of clients, such a set-top boxes, wireless phones, computers, and so on, are continually exposed to an ever increasing variety of content. A user of a set-top box, for instance, may view traditional television programming obtained from a broadcast network for display on a television, as well as pay-per-view movies, video-on-demand (VOD), interactive video games, and so on. Likewise, a user of a wireless phone may place and receive traditional telephone calls, as well as read email, schedule appointments, play digital music, and so on.

As shown in the previous examples, the capabilities provided by clients have also continued to increase to address the ever increasing varieties of content. For example, a user may be able to receive email on a computer as well as a set-top box, a personal digital assistant, and a wireless phone. Even though the capabilities of clients and networks that communicatively couple the clients have improved, a variety of applications are still not implemented due to failure of applications to address the capabilities and limitations of the clients and the networks. In other words, an application that may be configured for use on a particular type of client, such as a client having a particular combination of hardware and/or software capabilities, may have limited utility on another type of client that does not have the particular combination. Data-entry intensive applications, for instance, when implemented in a traditional television environment may be limited due to limitations of input devices available to the user and because of limited resolution of traditional televisions. For example, a traditional remote control may have buttons to directly enter television channels, offer four-way navigation, and manipulate power and volume. Functions such as text entry and searching through a large list of options, which may be readily performed when using a keyboard, may become onerous when using the traditional remote control.

In addition, limited resolution that is available on a standard definition television may limit the effective resolution of data that may be displayed to the user at any one particular time. For example, limitations in the display of readable text on a traditional National Television Systems Committee (NTSC) television may limit the amount of text that may be displayed on the television at any one time. Additionally, the distance at which the display is to be viewed may limit the effective resolution of the display. For instance, to display an electronic program guide on a standard definition television such that the display may be viewed when the user is positioned at a typical distance from the television, the text of the electronic program guide may be enlarged such that it is readable from the desired distance. Therefore, even if the user is provided with a keyboard, the television experience may not be unable to provide the functionality that is provided when the user interacts with the application using a computer.

Accordingly, there is a continuing need for user interfaces that address device capabilities and limitations to improve user interaction.

SUMMARY

Configuration of user interfaces is described. User interfaces are provided by a client to devices for initiation of control functions of the client. The user interfaces, for instance, are executed on the devices to initiate control functions of the client. For example, a user interface may be executed on a local device that is communicatively coupled to the client over a local network connection, such as a local area network (LAN). The user interface may also be executed on a remote device that is communicatively coupled to the client over a remote network connection, such as a wide area network (WAN). The local and remote devices execute the respective user interfaces that are obtained from the client to initiate control functions of the client, such as to record content. The user interfaces may be configured based on detected hardware and/or software capabilities of the respective local and remote devices that execute the user interfaces. Hardware and software capabilities may include resolution, processing power, memory resources, available applications, and so on. Therefore, the local and remote devices may each be provided with respective user interfaces for initiating control function of the client that address the hardware and/or software resources of the particular device.

In an implementation, a method includes receiving a query from a device. The query is for a user interface (UI) from a client. The UI, when executed by the device, is configured to form a request for execution of a control function by the client. A processing of the request determines whether the execution by the client of the control function is permitted. The processing is performed at a head end by using client state data. The hardware and/or software capabilities of the device to execute the UI are detected. The UI is configured based on the hardware and/or software capabilities of the device.

BRIEF DESCRIPTION OF THE DRAWINGS

The same reference numbers are utilized in instances in the discussion to reference like structures and components.

DETAILED DESCRIPTION

Overview

Figure 1:
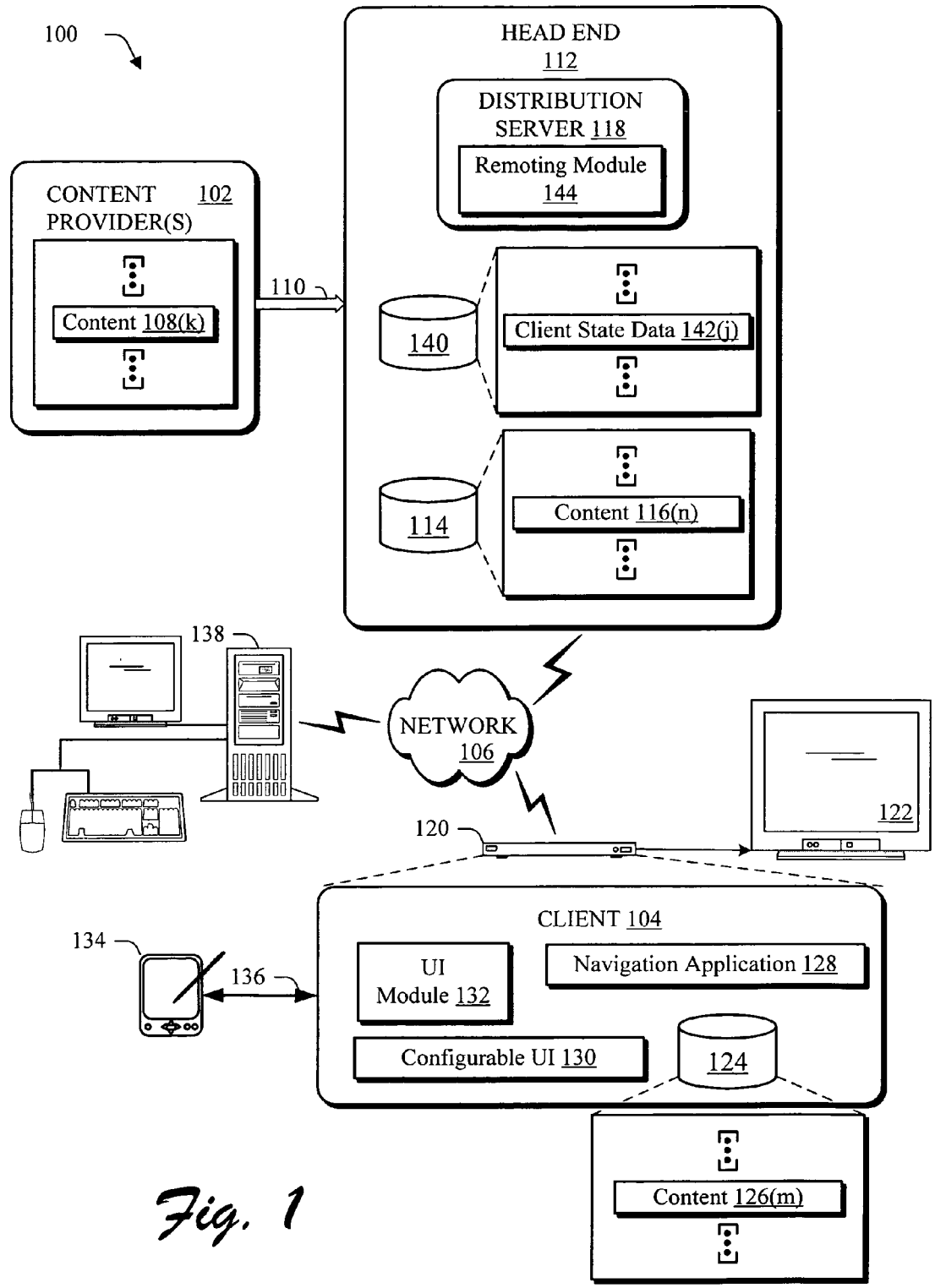
FIG. 1 is an illustration of an environment in an exemplary implementation that includes a content provider that is communicatively coupled to a client over a network.

Configuration of user interfaces (UIs) is described. UIs are provided by a client for initiation of control functions of the client. The UIs may be executed on a variety of devices to initiate control functions of the client. In an implementation, the UI may be executed on a local device that is communicatively coupled to the client over a local network connection (local connection). For example, the client may be configured as a set-top box that provides for output of broadcast content, such as traditional television programming, and provides for interaction with additional types of content, such as applications that are executed on the client, applications that are executed remotely over a network, and so on. The local device may be configured as a personal digital assistant (PDA), e.g. a "pocket" PC, which is communicatively coupled to the set-top box over a local radio frequency (RF) connection. The PDA executes a UI that is obtained from the set-top box to initiate control functions of the set-top box, such as to record content. The set-top box may configure the UI based on detected hardware and/or software capabilities of the PDA to execute the UI, such as resolution of the PDA, processing power, colors supported, and so on. Therefore, the PDA is provided with a UI that addresses the hardware and/or software resources of the PDA.

In another implementation, the UI may be executed on a remote device that is communicatively coupled to the client over a remote network connection (remote connection). Continuing with the previous example, the set-top box provides for the output of content that is received over a network from a head end, such as traditional broadcast television, video-on-demand (VOD), remote application processing, and so on. A remote device, such as a desktop computer, may also be communicatively coupled to the network. The remote device also executes a UI that is obtained from the set-top box to initiate control functions of the set-top box. The set-top box configures the UI based on detected hardware and/or software capabilities of the remote device to execute the UI. Therefore, the remote device may also be provided with a UI that addresses the hardware and/or software resources of the remote device. Further discussion of the configuration of UIs may be found in relation to FIGS. 3 and 7.

In a further implementation, the head end stores client state data to process the requests for control functions received from the UIs. For example, the head end may include client state data, such as ratings limits, favorite channels, levels of service, and so on, that is accessible locally by the head end. The head end may utilize this client state data to process requests provided by the UIs that are executed locally by the local device or remotely by the remote device. After the requests are processed, the head end may then cause the client to perform the control function. By processing the requests at the head end, the head end provides an authoritative source for processing control functions to be performed by the client. This may result in a variety of increased functionality that is available to the user, such as an ability to change from an old client to a new client without manually updating client state data from the old client to the new client and remote initiation of control functions without obtaining a connection with the client. Further discussion of the use of client state data by a head end may be found in relation of FIGS. 6 and 7.

Exemplary Systems

FIG. 1 is an illustration of an environment 100 in an exemplary implementation that includes a content provider 102 that is communicatively coupled to a client 104 over a network 106. The network 106 in the following implementations is an example of a wide area network (WAN), such as the Internet, and may also include a variety of other networks, such as a broadcast network, an intranet, a wired or wireless telephone network, and so forth.

The client 104 may be configured to receive content broadcast from the content provider 102 over the network 106. The content provider 102 includes content 108(k), where k can be any number from 1 to "K", that is locally stored on the content provider 102. The content 108(k) may include a variety of data, such as television programming, video-on-demand, an electronic program guide (EPG), one or more results of remote application processing, and so on. The content provider 102 provides the content 108(k) over a network 110 to a head end 112. The network 110 may be the same as or different from network 106. The content 108(k) may then be stored in a database 114 as content 116(n), where n can be any number from 1 to "N", on the head end 112 for broadcast over the network 106 to the client 104. In other words, the content 116(n) stored in the database 114 may be copies of the content 108(k) received from the content provider 102. The content 116(n) may also include additional data that is broadcast to the client 104. For example, the content 116(n) stored in the database 114 may include EPG data that is broadcast to the client 104 utilizing a carousel file system. The carousel file system repeatedly broadcasts the EPG data over an out-of-band (OOB) channel to the client 104 over the network 106.

The head end 112 may also include a distribution server 118 to format and distribute the content 116(n) over the network 106. Distribution from the head end 112 to the client 104 may be accomplished in a number of ways, including cable, RF, microwave, and satellite. Although the head end 112 is illustrated as separate from the content provider 102, the content provider 102 may also include the head end 112.

The client 104 may be configured as a computer that is capable of communicating over the network 106, such as a desktop computer, a mobile station, an entertainment appliance, a set-top box 120 that is communicatively coupled to a display device 122 as illustrated, and so forth. The client 104 may also relate to a person and/or entity that operate the client 104. In other words, client 104 may describe a logical client that includes a user and/or a machine. Although one client 104 is illustrated, a plurality of clients may be communicatively coupled to the network 106.

The client 104 may also include a database 124 having locally stored content 126(m), where m can be any number from 1 to "M". For example, the client 104 may be configured as a personal video recorder (PVR) that includes the database 124 stored in hard disk memory. Due to the size of the memory, users are able to record content. The PVR also offers control functions, such as the ability to pause content that is currently being broadcast and allows viewers to watch the content while still in progress from the point it was paused. The PVR plays back the content from disk memory, starting at the pause event, while continuing to record the currently-broadcast content in the disk memory. Additionally, the PVR may support other control functions, such as rewinding, fast forwarding a stored program, slow motion playback, and the like.

The client 104 is equipped with sufficient processing and storage capabilities to store and run a navigation application 128. The navigation application 128, when executed on the client 104, provides control functions for interacting with content. For example, the control functions may include the PVR control functions as previously discussed, as well as channel selection, EPG navigation, and so on.

The client 104 also includes a configurable UI 130 and a UI module 132. The configurable UI 130 provides an interface for execution on a device such that a user of the device may initiate one or more control functions of the navigation application 128. The UI module 132 is executed on the client 104 to configure the configurable UI 130 based on detected hardware and/or software resources of a device that is to execute the configurable UI 130. For example, a local device 134, such as a PDA as illustrated, may be communicatively coupled to the client 104 over a local connection 136. The UI module 132, when executed, detects the capabilities of the local device 134 to execute the configurable UI 130 and then configures the configurable UI 130 accordingly. The client 104 may also be communicatively coupled to a remote device 138, e.g. a desktop computer as illustrated, over the network 106. The UI module 132, when executed on the client 104, may also configured the configurable UI 130 based on the detected hardware and/or software capabilities of the remote device 138 to execute the configurable UI 130. The UI module 132 may be implemented in a variety of ways, such as an HTTP server that provides U's in an HTML format to the local and remote devices 134, 138. The client 104, through execution of the UI module 132, may provide U's for execution on the local and remote device 134, 138 based on the capabilities of the respective local and remote device 134, 138 to execute the UIs.

The head end 112 includes a database 140 for storage of a plurality of client state data 142(j), where j can be any number from 1 to "J", to process requests that were initiated by UIs that are executed on the local and remote device 134, 138. For example, the distribution server 118 may include a remoting module 144 that is executed on the distribution server 118 to process requests to cause the navigation application 128 of the client 104 to perform one or more control functions. The remoting module 144, when executed, processes the requests using the client state data 142(j) that corresponds to the client 104 that is to perform the control function. If the client 104 is permitted to perform the control function, the distribution server 118 causes the client 104, and specifically the navigation application 128, to perform the control function. In this way, the head end 112 provides an authoritative source for client state data 142(j) in the environment 100.

Although the set-top box 120 is shown separately from the display device 122, the set-top box 120 may be built into the display device 122 to form an integral unit. Furthermore, in other implementations, the client 104 may be embodied as other computers capable of executing the navigation application 128 and UI module 132, such as a broadcast-enabled computer, an information appliance, a laptop computer, a personal video recorder (PVR), or the like.

Figure 2:
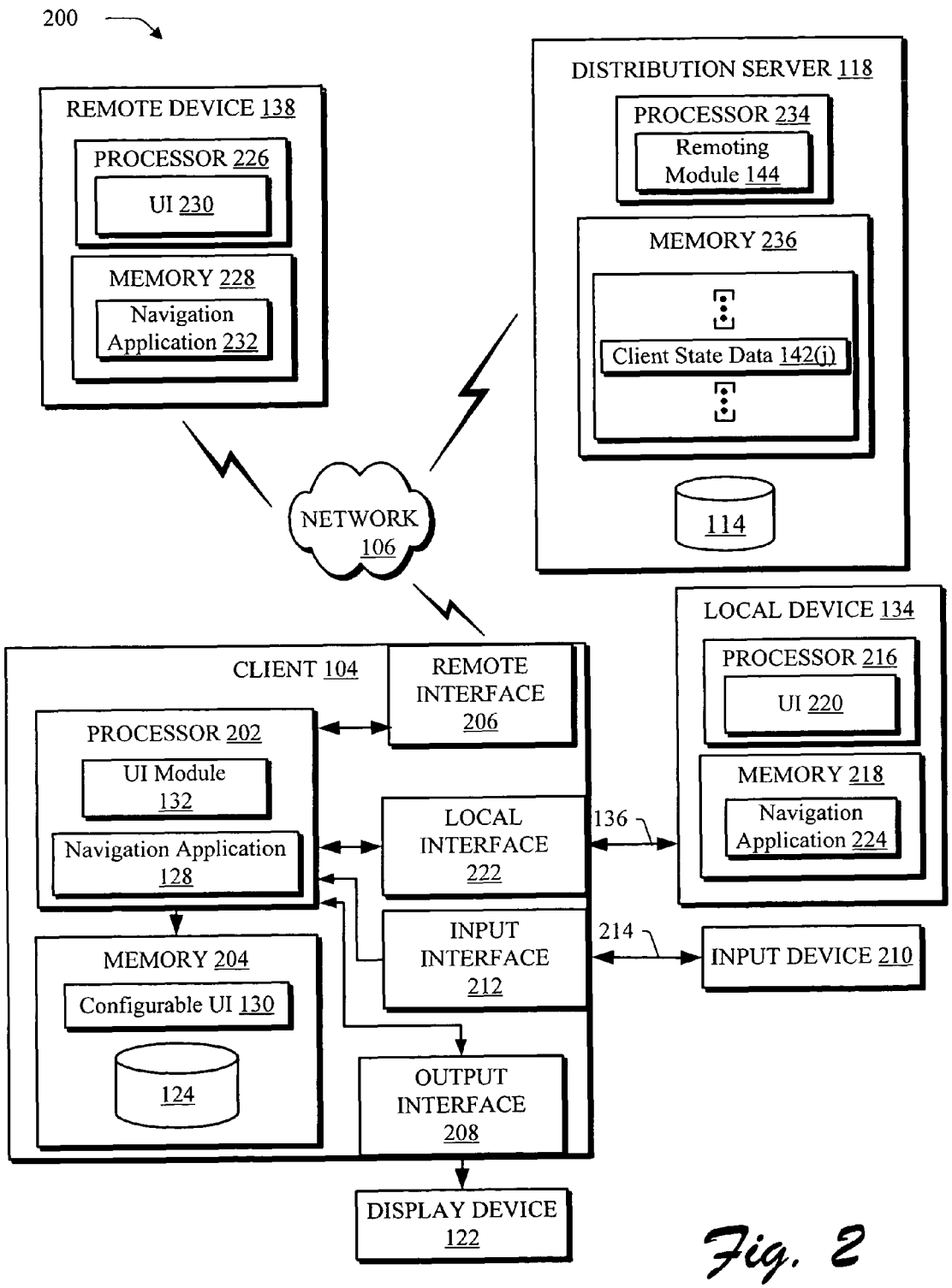
FIG. 2 is an illustration of an exemplary implementation showing a distribution server, the client, a local device, and a remote device of FIG. 1 in greater detail.

FIG. 2 is an illustration of an exemplary implementation 200 showing the distribution server 118, the client 104, the local device 134 and the remote device 138 of FIG. 1 in greater detail. The client 104 includes a processor 202 and memory 204. The UI module 132 and the navigation application 128 are illustrated as being executed on the processor 202 and are storable in memory 204. The configurable UI 130 is illustrated as being stored in the memory 204.

The client 104 may include a remote network interface (remote interface) 206 that may be utilized to receive the content 116(n) of FIG. 1 that is broadcast over the network 106. For example, the remote interface 206 may be configured as a tuner that receives broadcast content from over the network 106, may be configured as a transmitter/receiver (transceiver) that is suitable for two-way communication over the network 106, and so on. The content 116(n) may be stored in the database 124 for later output by the client 104 and/or provide for immediate output of the content 116(n). The database 124 is illustrated as being included in the memory 204, but may also be included in a separate storage device. For example, the storage device for the database 124 may be configured as a hard disk drive and the memory 204 may be configured as RAM, both the memory 204 and the storage device may be configured as RAM, both the memory 204 and the storage device may be configured as removable memory, and so forth. The client 104 executes the navigation application 128 to retrieve the content 126(m) of FIG. 1 from the database 124 and output the content 126(m) through an output interface 208 for rendering on the display device 122. Thus, in this implementation, the client 104 is capable of operating as a PVR that stores and plays back the content 126(m) of FIG. 1 in a manner akin to a video cassette recorder.

The client 104 may be controlled by a user via inputs provided by an input device 210. The inputs are received by the client 104 from an input interface 212 over a local connection 214. The local connection 214 may be the same as or different from the local connection 136 that communicatively couples the local device 134 with the local interface 222. The input interface 212, local connection 214 and input device 210 may be configured in a variety of ways. For example, the input interface 212 may be configured as a wireless port, such as an infrared (IR) or Bluetooth wireless port, for receiving wireless communications from input device 210, such as a remote control device, a handheld input device, or any other wireless device, such as a wireless keyboard. In alternate embodiments, the input interface 212 may use an RF communication link or other mode of transmission to communicate with client 104, such as a wired connection which may include a universal serial bus (USB) connection, and so on.

When output of content is requested, the navigation application 128 is executed on the processor 202 to obtain content, such as from content that is streamed from the distribution server 118 over the network, content 126(m) that is stored locally on the database 124, and so on. The navigation application 128 may also restore the content to the original encoded format as provided by the content provider 102 of FIG. 1. For example, content 116(n) of FIG. 1 may be compressed and then streamed from the distribution server 118 to the client 104. Therefore, when the navigation application 128 receives the content, the content may be decompressed for rendering by the display device 122.

The client 104 may also be controlled through use of a UI that is executed by a device. For example, the local device 134 may include a processor 216 and memory 218. The local device 134 includes a UI 220 that was provided by the client 104 through execution of the UI module 132 and the configurable UI 130. When executed on the processor 216, the UI 220 enables a user to initiate one or more control functions of the navigation application 128 on the client 104. The local device 134 is communicatively coupled over the local connection 136 to the client using a local interface 222. The local device 134 may also include a navigation application 224 to provide for content interaction on the local device 134 itself. The navigation application 224, for instance, may be configured as a browser, a media player, and so on.

The remote device 138 may also include a processor 226 and memory 228. Like the local device 134, the remote device 138 includes a UI 230 that is illustrated as being executed on the processor 226 and is storable in memory 228. The remote device 138 may also include a navigation application 232 that may be similar to or different from the navigation applications 128, 224 of the client 104 and/or local device 134. When executed on the processor 226, the UI 230 enables a user to initiate one or more control functions of the navigation application 128 on the client 104. By interacting with the UI 230 on the remote device 138, the user of the remote device 138 is able to initiate control functions of the client 104 from over the network 106. Communication between the remote device 138 and the client 104 may also be provided using the remote interface 206.

By initiating the control functions by the U's 220, 230, the user can request a variety of control functions. Examples of control functions include recordation of content 116(n) of FIG. 1 that is streamed over the network 106 to the client 104, navigation through content, such as to fast forward, rewind or pause the output of the content, and so on. The control functions, for example, may provide non-linear playback of the content (i.e., time shift the playback of the content) such as pause, rewind, fast forward, slow motion playback, and the like. For instance, during a pause, the client 104 may continue to record the content in the database 124. The client 104, through execution of the navigation application 128, may then playback the content 126(m) of FIG. 1 from the database 124, starting at the point in time the content 126(m) was paused, while continuing to record the currently-broadcast content 126(m) in the database 124.

The distribution server 118 included in the head end 112 of FIG. 1 also includes a processor 234 and memory 236. The remoting module 144 is illustrated as being executed on the processor 234 and is storable in memory 236. Client state data 142(j) is illustrated as being stored in memory 236. The database 114 is illustrated as included in the memory 236, but may also be included in a separate storage device. For example, the storage device for the database 114, like the database 124 of the client 104, may be configured as a hard disk drive and the memory 236 may be configured as RAM, both the memory 236 and the storage device may be configured as RAM, both the memory 236 and the storage device may be configured as removable memory, and so forth. Thus, the distribution server 118 may locally access the client state data 142(j).

The distribution server 118 executes the remoting module 144 on the processor 234 to process requests to initiate control functions of the navigation application 128 on the client 104. The requests may originate from the UIs 220, 230 that are executed on the respective local and remote devices 134, 138. The remoting module 144, when executed on the processor 234, processes the requests according to client state data 142(j) that is stored in the memory 236. For example, a plurality of client state data 142(j) may be stored in the memory 236 that corresponds to a plurality of clients that receive content from the head end 112 of FIG. 1. Each collection of client state data 142(j) for a particular client may include general operations data utilized by the particular client, such as rating limits, favorite channels, level of service provisioned, and so on. The network 106 connecting the head end 112 to the client 104 and the remote device 138 may have sufficient bandwidth and reliability such that the head end 112 is the authoritative source for this information. In other words, the head end 112 may be considered the primary source for the client state data 142(j) for a particular client, even over the client 104 itself. For example, by storing the client state data 142(j) on the distribution server 118, a user may switch set-top boxes without transferring client state data between the set-top boxes.

Additionally, by storing client state data 1420) for local access by the distribution server 118, low resource clients may be utilized to output content yet high-resource functionality may still be provided to devices which execute the UI to control the client 104. For example, a low resource client, such as a client having limited hardware and/or software resources, may be configured to decrypt and output content for rending on a display device. The low resource client may also provide local storage of content, such as on a hard disk drive. A feature-rich remote device, such as a desktop computer having significant processing resources, may execute a UI that would not be able to be executed on the low resource client. The UI, for instance, may have a higher resolution (e.g. more dots per inch), support a greater number of colors for output, provide macros to initiate control functions (e.g. recording of all episodes of a particular television program), and so on. In this way, the UI may provide additional functionality to a user of the client. Examples of UIs configured for output by devices having different capabilities may be found in relation to FIGS. 4 and 5.

Exemplary Procedures

Figure 3:
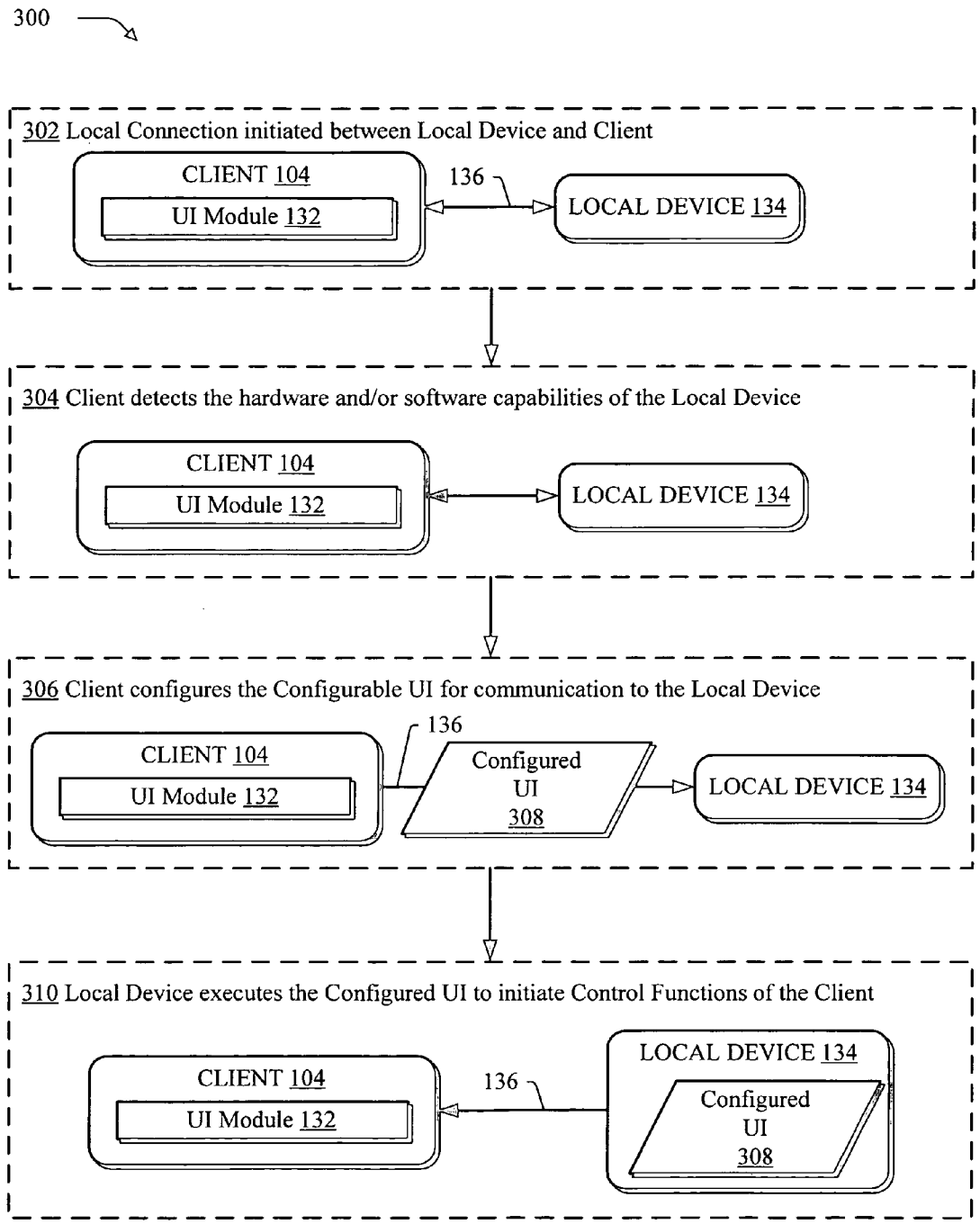
FIG. 3 is a flow diagram of a procedure in an exemplary implementation in which the client configures a user interface for execution on the local device of FIG. 2.

FIG. 3 is a flow diagram of a procedure 300 in an exemplary implementation in which the client 104 configures a UI for execution on the local device 134 of FIG. 2. At block 302 a local connection is initiated between the local device 134 and the client 104. A variety of local connections may be initiated, such as wired and wireless connections. An example of a wired connection is an Ethernet connection, which may be utilized to connect a plurality of devices to each other locally over an Ethernet network. A variety of wireless connections are also contemplated, such as wireless connections that are compliant with the Infrared Data Association (IrDA) standard, the Shared Wireless Access Protocol (SWAP) standard developed by the HomeRF Working Group, IEEE 802.11b and 802.1 μg developed by the Wireless Ethernet Compatibility Alliance (WECA), Bluetooth, and so on.

At block 304, the client 104 detects the hardware and/or software capabilities of the local device 134 through execution of the UI module 132. For example, the client 104 may detect hardware capabilities such as processor speed, data bus bandwidth, data throughput speed of one or more buses of the local device 134, amount of memory space available on the local device 134, supported resolutions and color palettes of an included display device, fonts supported, availability of input devices (e.g., touch screens, cursor control devices, buttons, keyboards, and so on), availability of audio input/output devices, and so forth. The client 104 may also detect software capabilities of the local device 134, such as computer languages supported, availability of applications on the local device 134, (e.g., browsers, media players, and so on), drivers implemented on the local device 134, and so forth.

At block 306, the client 104 configures a configurable UI for communication to the local device 134 based on the detection. The client 104, for instance, may execute the UI module 132 to configure the configurable UI 130 of FIG. 2 based on the detected capabilities of the local device 134. A variety of configurations may be provided, such as through different arrangements of functions and display characteristics of the UI. Further description of configuration of UIs may be found in relation to FIGS. 4 and 5. The client 104 may then communicate the configured UI 308 to the local device 134 over the local connection 136.

At block 310, the local device 134 executes the configured UI 308 to initiate control functions of the client 104. For example, the user may utilize an input device, such as a touch screen of a PDA, to initiate a control function by "pressing" a button of the configured UI 308. The configured UI 308 may then form a request that indicates the desired control function and communicate the request directly to the client 104 over the local connection 136. Thus, in this implementation, the control function may be provided directly to the client 104 without communicating the request over the network 106. Additional discussion of processing requests may be found in relation to FIG. 6.

Although the implementation of FIG. 3 described configuration of the UI by the client 104, the UI may be configured in a variety of ways. In another implementation, the configurable UI 130 of FIG. 2 is implemented as a self-contained configurable UI that includes software to configure the presentation and implementation of the UI when received and/or executed on a device. For instance, the configurable UI 130 of FIG. 2 may be received by the local device 134, and when executed on the local device, detects hardware and/or software capabilities of the local device 134 to execute the UI. In a further implementation, the UI is configured by a distribution server, an example of which is described in relation to FIG. 7.

Exemplary User Interfaces

Figure 4:
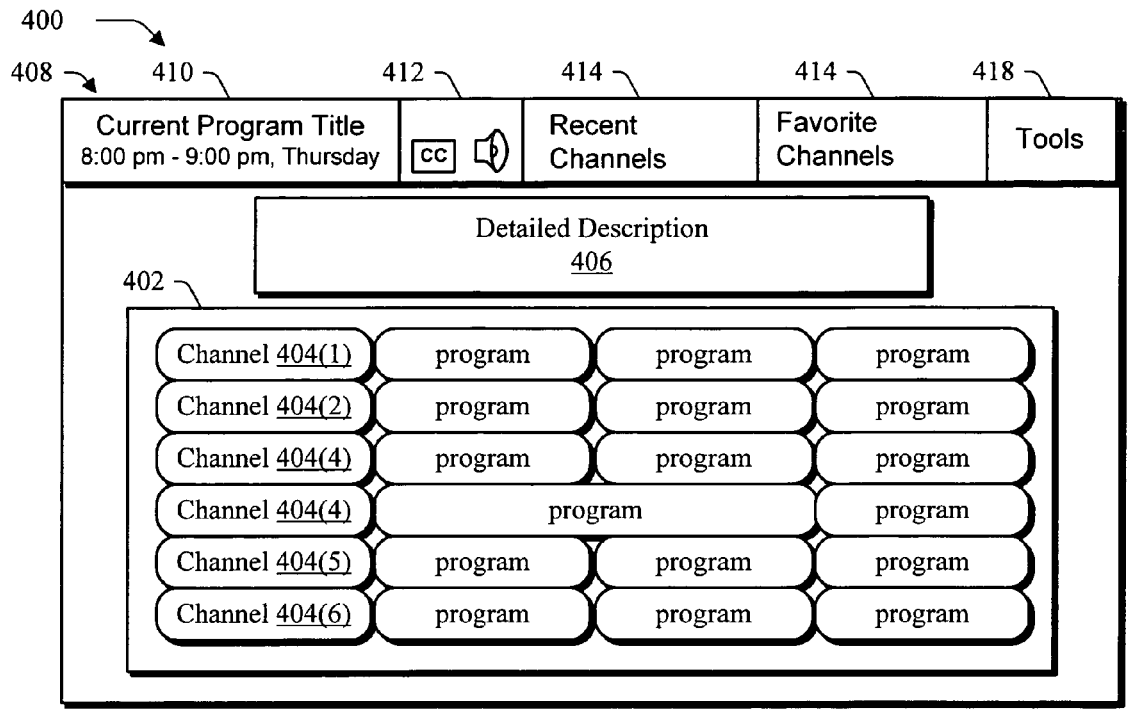
FIG. 4 is an illustration of an exemplary implementation showing a user interface that is configured for output by the client when the user is located close to the display device, such as the display device of FIG. 1.

UIs may be configured in a variety of ways based on the capabilities of the device that is to execute the UI. FIG. 4 is an illustration of an exemplary implementation showing a UI 300 that is configured for output by the client when the user is located close to the display device, such as the display device 122 of FIG. 1. As previously stated, because devices utilized to execute the UI's may have different capabilities, and because the distance of a user from a display device may change, U's may be configured to address the different capabilities and distances. For example, a user located close to a display device may be able to perceive a greater amount of detail than if the user is located at a further distance from the display device. Additionally, input devices of the local and remote devices 134, 138 of FIG. 2 may provide different respective functionality. For example, a local device may be configured for pen-based navigation, and a remote device having a mouse and keyboard may be configured for data-intensive input and navigation. Therefore, different UIs may be provided which are configured for the different respective functionality of the input devices.

UI 400 is configured for use when the user is located close to the display device. The UI 400 includes a channel guide 402 that lists a plurality of channels 404(1)-404(6) that is available from a broadcast. The UI 400 also includes a detailed description 406 of one of the plurality of programs that may provide information related to the program, such as actor, short description of the plot of the program, and so on. The UI 400 also includes a menu bar 408 to enable a user to navigate between functionality utilizing a cursor control device, such as a mouse. The illustrated menu bar 408 has functionality including current program title 410, audio functionality 412 such as closed captioning and stereo, recent channels 414, favorite channels 416, and tools 418, such as options for arrangement, font selection, and so on.

Figure 5:
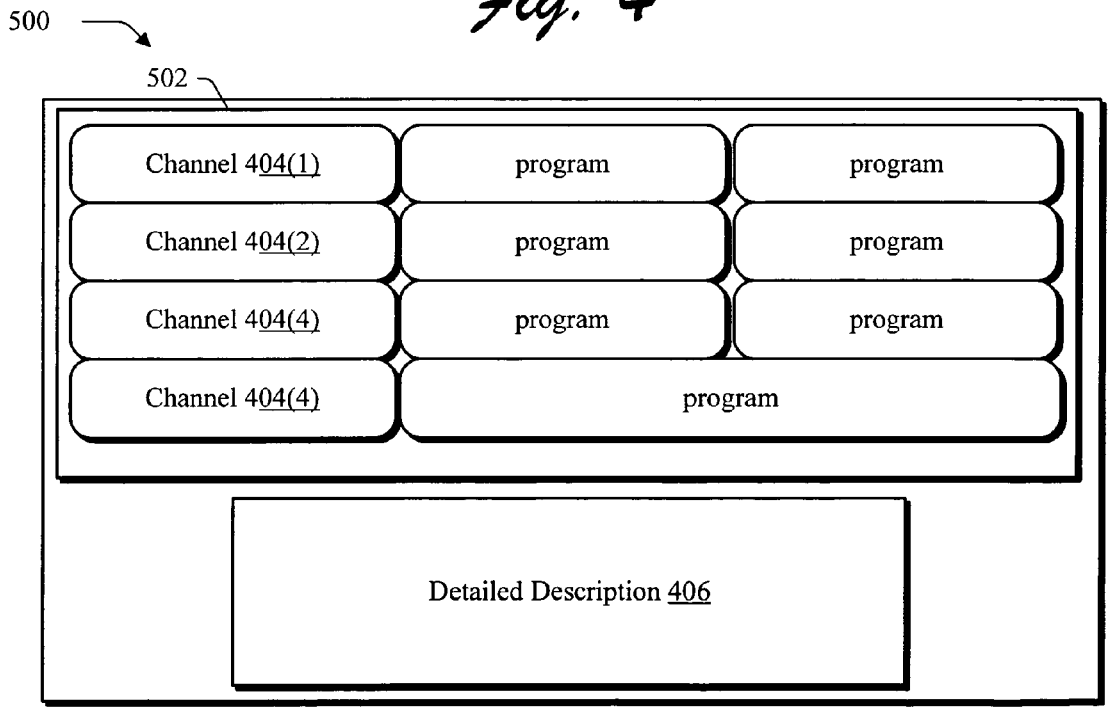
FIG. 5 is an illustration of an exemplary implementation showing a user interface that is configured for output by the client when the user is located at a greater distance from the display device than the user interface of FIG. 4.

FIG. 5 is an illustration of an exemplary implementation showing a UI 500 that is configured for output by the client when the user is located at a greater distance from the display device than the UI 400 of FIG. 4. The UI 500 may include a portion of the functionality provided in the UI 500 of FIG. 5. For example, the UI 500 may also include a channel guide 502 that lists a plurality of channels 404(1)-404(4) that is available from a broadcast. However, the channel guide 502 is configured to be viewed from a greater distance than the channel guide 402 of FIG. 4 and to be output by a display device having a lower resolution than the display device for outputting the UI 400 of FIG. 4. Therefore, the channel guide 502 includes fewer channels and programs in an enlarged format than the channel guide 402 of FIG. 4.

Additionally, the arrangement of functionality of the UI 500 may be different from the UI 400 of FIG. 4. UI 500, for example, may also include the detailed description 406 but have the detailed description 406 arranged below the channel guide 502, as opposed to above the channel guide 402 in the UI 400 of FIG. 4. Further, the UI 500 does not include the menu bar 408 of the UI 400 of FIG. 4. For example, the UI 500 may be provided at a lower resolution, i.e. fewer dots-per-inch, than the UI 400 of FIG. 4 so that the UI 500 is viewable from a greater distance. Therefore, although the UI 400 of FIG. 4 includes functionality that is not included in the UI 500 of FIG. 5, the UI 500 is viewable from a greater distance. Although arrangement of functions, display of functions and resolution have been described as differences between the UIs 400, 500 of FIGS. 4 and 5, respectively, a variety of other differences are also contemplated. For example, the color scheme of the UI 500 may be selected such that the UI 500 is viewable from a greater distance, such as through selection of colors having greater contrast than those utilized in the UI 400 of FIG. 4. Further, the visibility and typeface of the functions may also be altered for each UI to provide an optimized viewing experience. For instance, the display device for outputting the UI 400 of FIG. 4 may support a greater number of colors than the display device for outputting the UI 500 of FIG. 5.

Figure 6:
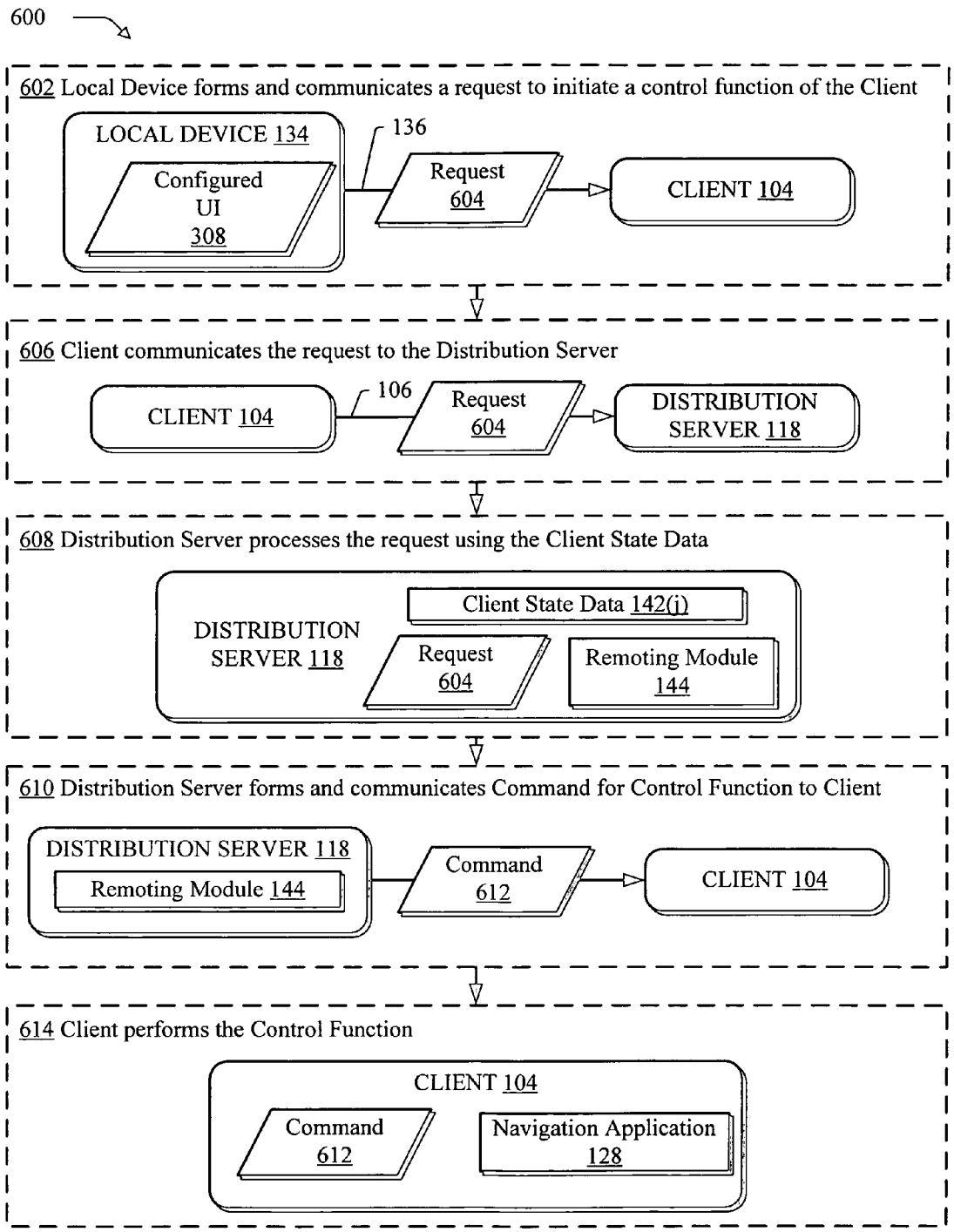
FIG. 6 is a flow diagram depicting a procedure in an exemplary implementation in which a configured user interface of FIG. 3 is employed by a user to initiate a control function of the client.

FIG. 6 is a flow diagram depicting a procedure 600 in an exemplary implementation in which the configured UI 308 of FIG. 3 is employed by a user to initiate a control function of the client 104. At block 602, the local device 134 forms and communicates a request 604 to initiate a control function of the client 104. For example, the configured UI 308, when executed on the local device 134, may provide one or more techniques for initiating the control function. A wireless phone, for instance, may execute the configured UI 308 that includes a voice menu to enable a user to navigate through a listing of available control functions, and initiate one or more of the control functions. A request is then formed for initiation of the desired control function and communicated to the client 104, such as over the local connection 136.

At block 606, the client 104 communicates the request 604 to the distribution server 118. In an implementation, the client 104 executes the UI module 132 of FIG. 2 to package the request 604 for forwarding over the network 106 to the distribution server 118. In another implementation, the request 604 is formatted for routing to the distribution server 118 by the local device 134 without packaging by the client 104.

At block 608, the distribution server 118 processes the request using the client state data 142(*j*). The remoting module 144, for instance, may be executed on the distribution server 118 to process the request 604 according to client state data 1420) that is locally available to the distribution server 118, such as stored in a hard drive, RAID array, and so forth. The request 604 is processed according to client state data 1420) that is specific to the client 104.

The request 604 may include a unique client identifier such that the remoting module 144 may locate client state data 1420) that corresponds to the particular client 104. Once the client state data 1420) is located, the remoting module 144, when executed, determines whether performance of the control function is permissible on the client 104. For example, the request 604 may be configured to initiate a control function on the client 104 to record content, e.g. a television program, and the distribution server 118, through examination of the client state data 1420), may determine whether the client 104 is permitted to record the content. In another example, the request 604 is configured to tune the client 104 to a desired television channel, and the distribution server 118 may then determine whether the client 104 has a subscription to that particular television channel.

At block 610, the distribution server 118 forms and communicates a command 612 to perform the control function to the client 104. Continuing with the previous example, the remoting module 144, when executed, may determine that the client 104 is permitted to perform the control function and therefore form the command 612 for communication to the client 104. If the client 104 is not permitted to perform the control function, the remoting module 144 may form a response for communication to the local device 134 to indicate that the control function is not permitted. In another implementation, an extra interface may be designed on the client 104 to "listen" to the head end for updates. For example, the UI module 132, when executed on the client 104, may periodically log onto the network 106 to receive and/or request commands provided by the head end 112 to perform one or more control functions.

At block 614, the client 104 performs the control function. For example, the client 104 may receive the command 612 from the distribution sever 118. The command may be encrypted utilizing a variety of encryption techniques to protect the command from being impersonated by an attacker. The navigation application 128 and/or the UI module 132, when executed, may decrypt the command 612 to determine which control function is to be performed. The navigation application 128 may then perform the control function indicated. The navigation application 128, for instance, may record a particular television program at a particular time, may change which broadcast channel is output by the client 104 to the display device 122 of FIG. 2, tune to a favorite channel, and so on. Although the implementations discussed in relation to FIGS. 3 and 6 describe the configuration and execution of a UI on a local device 134, the remote device 138 may also provide similar functionality, as is described in greater detail in the following implementation.

Figure 7:
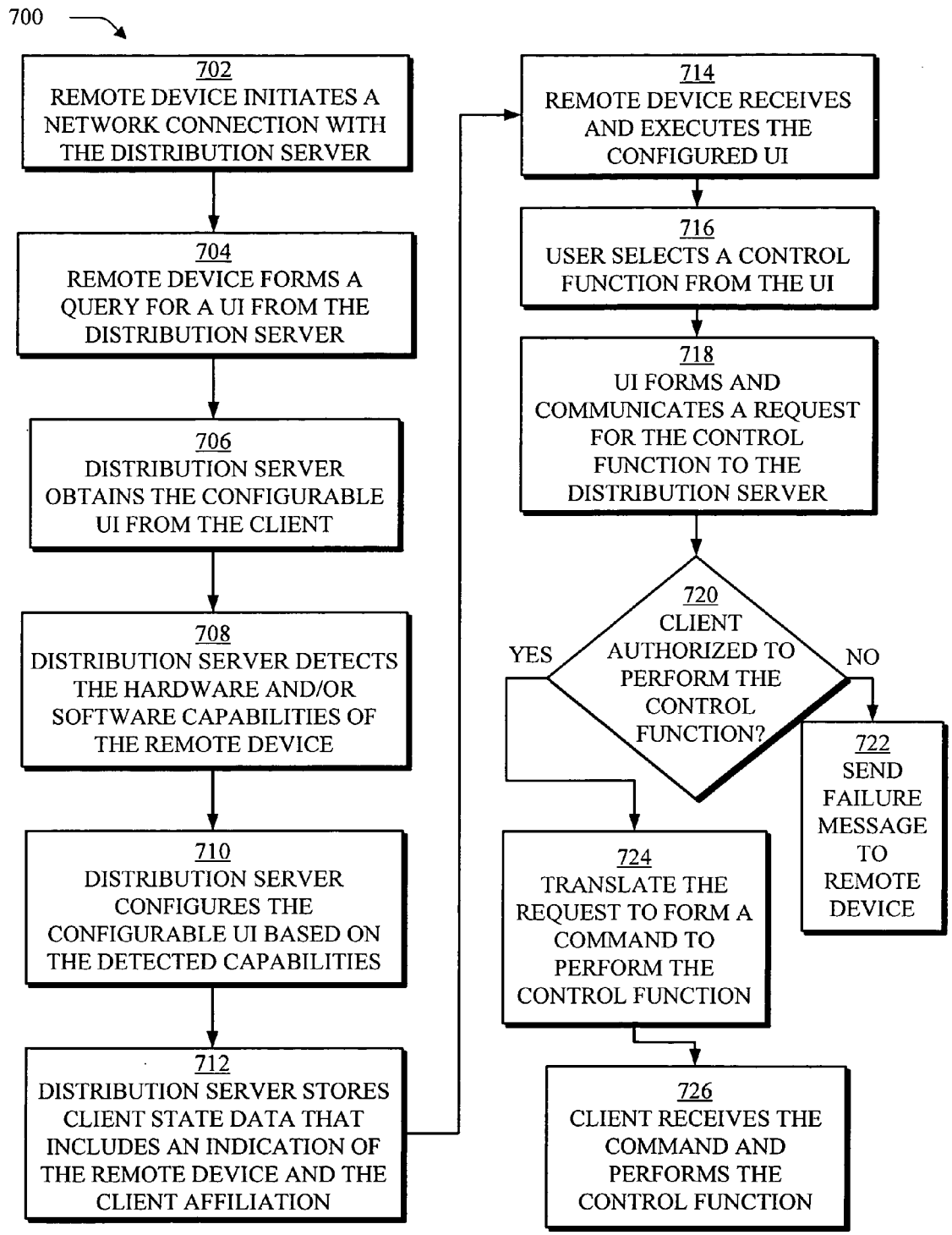
FIG. 7 is a flow diagram depicting a procedure in an exemplary implementation in which a user interface is configured for and executed by the remote device of FIG. 2 to initiate one or more control functions of the client.

FIG. 7 is a flow diagram depicting a procedure 700 in an exemplary implementation in which a UI is configured for and executed by the remote device 138 of FIG. 2 to initiate one or more control functions of the client 104. At block 702, a remote device initiates a remote connection with the distribution server. For instance, the remote device 138 of FIG. 2 may initiate a remote connection over the network 106 with the distribution server 188 of FIG. 2. The network 106 may assume a variety of configurations, such as a wide area network (WAN), e.g. the Internet, and so forth. A WAN may be considered as a geographically dispersed network, which includes a broader telecommunication structure than a local area network (LAN). A WAN, for instance, may be privately owned, leased or rented, but in most instances includes at least a portion of a public (e.g., shared user) network.

At block 704, the remote device forms a query for a UI from the distribution server that is suitable for initiating control functions of a client. The remote device, for instance, may form the query for communication over the network which identifies a desired client. In an implementation, the query includes the network address of the client. In another implementation, the distribution server includes a locally stored listing of client locations. In a further implementation, the distribution server queries the network 106 of FIG. 2 to locate the client. For instance, the remoting module 144, when executed on the distribution server 118, may act as a browser for locating desired network resources, which in this instance includes the client 104 of FIG. 2.

At block 706, the distribution server obtains the configurable UI from the client. For example, the distribution server may form an additional query that is communicated to the client over a network. The distribution server may then receive a response to the query that includes the configurable UI.

At block 708, the distribution server detects the hardware and/or software capabilities of the remote device over the remote connection. Like the client as previously described, the distribution server may detect processing speeds, available software, and so on, of the remote device 138 which indicate the capabilities of the remote device to execute the UI. At block 710, the distribution server configures the configurable UI based on the detect capabilities to form a UI that is configured for the remote device. The distribution server, for instance, may arrange functions of the configurable UI, select functions based on available input devices, and so on. In another implementation, the UI may be configured based on a likely distance at which the user is positioned from the remote device when viewing the UI. For example, as previously described, device may be configured to be viewed at different distances, such as a television in a living room as opposed to a PDA that is held in the hand of the user. By configuring the configurable UI based on the likely distance of the user from the device, the configured UI may be optimized for viewing by the user.

At block 712, the distribution server stores client state data that includes an indication of the remote device and the client affiliation. The distribution server, for instance, may store data that includes an identifier of the remote device that received the configured UI and a corresponding indication of client affiliation for that particular UI. Therefore, when the distribution server receives a request from the remote device, the distribution server may readily identify a destination for the request, i.e. a particular client. Although configuration of the configurable UI is described in this implementation as being performed by the distribution server, the configurable UI may be configured in a variety of ways. For example, the configurable UI may be configured by the client as described in relation to FIG. 3, configured automatically by the configurable UI itself, and so on.

At block 714, the remote device receives and executes the configured UI, such as by executing the UI 230 on the processor 226 of FIG. 2. At block 716, a user selects a control function by interacting with the UI. For example, a user may utilize an input device of the remote device, such as a keyboard, mouse, microphone to receive a voice command, and so forth, to select one of a plurality of control functions for initiation. At block 718, the UI forms and communicates a request for the control function to the distribution server. Therefore, in this implementation, a request initiated by a remote device 138 is communicated directly to the distribution server 118 over the network 106 without first being communicated through the client 104.

At decision block 720 a determination is made as to whether the client is authorized to perform the requested control function. As previously described, the determination may be made by the distribution server by processing the request utilizing client state data of the client that is to perform the control function. If the client is not authorized to perform the control function, the procedure 700 ends at block 722 by sending a failure message to the remote device that indicates that the client is not authorized to perform the requested control function.

If the client is authorized to perform the control function according to the client state data, then at block 724 the distribution server translates the request to form a command for communication to the client to perform the control function. For example, the request for initiating the control function that was formed by the remote device may not be compatible with the client. Therefore, the distribution server may translate the request into a command that causes the client to perform the corresponding control function. Therefore, at block 726, the client may receive the command and perform the control function as indicated in the command.

Thus, an environment for configuration and utilization of UI is provided. In an implementation, the head end is configured to be the authoritative source for client state data in the environment as previously described. In addition, the head end may have the capacity to recognize capabilities of devices, such as a Web browser accessible over the Internet, a set-top box communicatively coupled to a standard definition television, a set-top box communicatively coupled to a high-definition television, a wireless phone, a PDA, and so on, both by client affiliation and by the hardware and/or software capabilities.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed by a distribution server comprising:
    receiving a request on the distribution server from a computing device, wherein the request is:
        to execute a control function on a particular client for content interactions including recordation of content received via a broadcast locally at the particular client; and
        formed by a user interface (UI) that is configured based on functionality of a detected input device of the computing device, the user interface configured for touch-based navigation when the detected input device comprises a touch-screen, and the user interface configured for data-intensive input and navigation when the detected input device comprises a keyboard;
    processing the request on the distribution server to determine whether execution of the control function by the particular client is permitted, wherein the distribution server:
        includes client state data for a plurality of said clients; and
        the request is processed using the client state data that corresponds to the particular client; and
    if execution of the control function is permitted, forming a command for communication to the particular client to perform the control function to cause recordation of the content received via a broadcast locally at the particular client.

2. The method as described in claim 1, wherein the client state data for each said client is selected from the group consisting of:
    ratings limits of content for output;
    favorite channels;
    one or more levels of content service; and
    general operations data for content output.

3. One or more computer readable media comprising computer executable instructions that, when executed, perform the method of claim 1.

4. A method performed by a client comprising:
    receiving a request at the client to perform a control function that includes recording content locally at the client, wherein the request is:
        received via a distribution server from a computing device communicatively coupled to the distribution server over a wireless wide area network such that the request is not communicated directly from the computing device to the client; and
        formed by a user interface (UI) that is configured based upon functionality of a detected input device of the computing device, the user interface configured for touch-based navigation when the detected input device comprises a touch-screen, and the user interface configured for data-intensive input and navigation when the detected input device comprises a keyboard; and
    responsive to the request, recording content locally at the client that is received via a broadcast at the client from the distribution server.

5. The method as described in claim 4, wherein the client receives a command to cause the client to perform the control function from the distribution server if the distribution server determines that client execution of the control function is permitted.

6. The method as described in claim 5, wherein the configuring of the UI is selected from the group consisting of the following:
    selecting one or more of a plurality of functions for inclusion in the UI;
    arrangement of said functions for navigation by a user;
    visibility of said functions for display;
    resolution of said functions for display;
    typeface of said functions for display; and
    color scheme of said functions for display.

7. The method as described in claim 5, wherein the UI is further configured based on a likely distance at which a user is positioned from the computing device when viewing the user interface.

8. The method as described in claim 4, wherein the UI is further configured based on one or more detected hardware and software capabilities of the computing device, the one or more detected hardware and software capabilities selected from the group consisting of:
    one or more applications that are available for execution on the computing device;
    device drivers;
    available output devices;
    processing speed;
    amount of available memory;
    resolution of a display device included on the computing device; and
    available color palette for display of colors on a display device of the computing device.

9. The method as described in claim 5, wherein the request is configured for processing at the distribution server using client state data to determine whether the client is permitted to perform the control function, the client state data being selected from the group consisting of:
    ratings limits of content for output by the client;
    favorite channels of the client;
    one or more levels of content service for the client; and
    general operations data for content output that is specific to the client.

10. A method performed by a computing device comprising:
    receiving a user interface (UI), at the computing device, that is configured based upon functionality of a detected input device of the computing device, the user interface configured for touch-based navigation when the detected input device comprises a touch-screen, and the user interface configured for data-intensive input and navigation when the detected input device comprises a keyboard; and
    forming a request for communication to one or more distribution servers over a wireless wide area network and for communication from the one or more distribution servers to a client, the request configured to cause the client to record content broadcast by the one or more distribution servers to the client locally at the client.

11. The method as described in claim 10, wherein the client receives the request to cause the client to perform the one or more control functions from the distribution server if the distribution server determines that client execution of the one or more control functions are permitted.

12. The method as described in claim 10, wherein the configuring of the UI is selected from the group consisting of the following:
- selecting one or more of a plurality of functions for inclusion in the UI;
- arrangement of said functions for navigation by a user;
- visibility of said functions for display;
- resolution of said functions for display;
- typeface of said functions for display; and
- color scheme of said functions for display.

13. The method as described in claim 10, wherein the UI is further configured based on a likely distance at which a user is positioned from the computing device when viewing the user interface.

14. The method as described in claim 10, wherein the UI is further configured based on one or more detected hardware and software capabilities of the computing device, the one or more detected hardware and software capabilities selected from the group consisting of:
- one or more applications that are available for execution on the computing device;
- device drivers;
- available output devices;
- processing speed;
- amount of available memory;
- resolution of a display device included on the computing device; and
- available color palette for display of colors on a display device of the computing device.

15. The method as described in claim 10, wherein the request is configured for processing at the distribution server using client state data to determine whether the client is permitted to perform the control function, the client state data being selected from the group consisting of:
- ratings limits of content for output by the client;
- favorite channels of the client;
- one or more levels of content service for the client; and
- general operations data for content output that is specific to the client.

* * * * *